E. F. WACKWITZ.
SPARK PLUG ADAPTER.
APPLICATION FILED JULY 7, 1919.

1,402,552.

Patented Jan. 3, 1922.

Inventor:
E. F. Wackwitz,
by Jesse A. Holton
atty.

UNITED STATES PATENT OFFICE.

ERNEST F. WACKWITZ, OF ARLINGTON HEIGHTS, MASSACHUSETTS.

SPARK-PLUG ADAPTER.

1,402,552.   Specification of Letters Patent.   Patented Jan. 3, 1922.

Application filed July 7, 1919. Serial No. 308,917.

*To all whom it may concern:*

Be it known that I, ERNEST F. WACKWITZ, a citizen of the United States, residing at Arlington Heights, in the county of Middlesex and State of Massachusetts, have invented certain new and useful Improvements in Spark-Plug Adapters, of which the following is a full, clear, and exact description.

This invention relates to spark plug adapters, and with respect to certain more specific features thereof, to means interchangeable with standard parts of a spark plug for the purpose of thereby providing an organization of parts communicating with the combustion chamber of an internal combustion engine, suitable to receive a gauge for determining the amount of compression.

It is one of the objects of the present invention to provide a simple, inexpensive and compact adapter member which may be substituted for the removable porcelain part of the spark plug.

It is another object of the invention to provide said adapter with means projecting beyond or above the locking cap of the spark plug when the parts are assembled with the adapter in its operative position. This enables the operator to readily apply his tire gauge, and take his reading.

It is understood that devices have been constructed for the purpose of determining the amount of compression within an engine cylinder, and that certain of these devices have been interchangeable with the complete spark plug which communicates with the engine cylinder. It is believed, however, that prior to the present invention means have never been devised for converting the spark plug itself into an air passage or conduit to connect an engine cylinder with a portable detachable gauge for the purpose of determining the amount of compression in the engine cylinder, particularly as disclosed herein.

Other objects will be in part obvious, and in part pointed out particularly hereinafter.

The invention accordingly consists in the various features of construction, combinations of elements and arrangements of parts which will be exemplified by the construction hereinafter set forth, and the scope of the application of which will be indicated in the following claims.

In the drawings wherein is shown one of various possible embodiments of the invention:

Figures 1, 2:
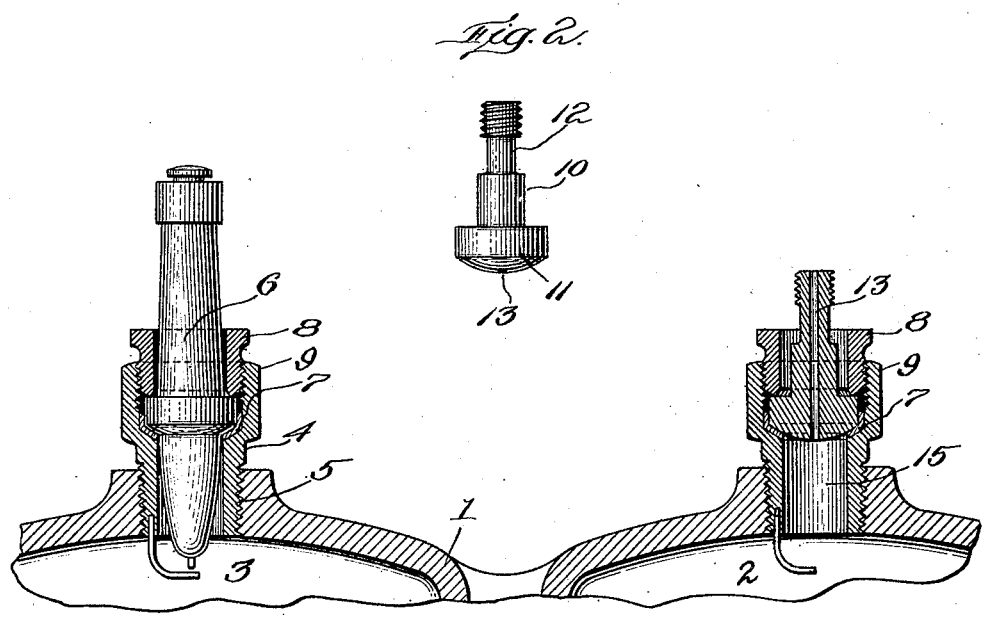
Fig. 1 is a fragmentary view of the head of an internal combustion engine, showing two plugs, one being a spark plug of standard construction, and the other being a similar plug modified with the adapter of the present invention.
Fig. 2 is a view of the adapter member.

Referring now more particularly to the drawings. There is indicated at 1 the head wall of the casing of an internal combustion engine. A combustion chamber is shown at 2 and another one at 3. The numeral 4 indicates generally a standard type of spark plug, threaded into an opening 5 provided therefor in the casing in communication with the combustion chamber 3. As is well known, these spark plugs are provided with a removable porcelain member 6, which carries one of the electrodes. Normally this porcelain member is held in its assembled position in the plug against a gasket 7 by means of a threaded cap 8, which threads into a jacket 9, which in turn is threaded into the opening 5 in the engine casing.

The adapter member itself is shown in Figure 2 at 10, and comprises simply a stud having an enlarged base 11 rounded slightly to adjust itself to the gasket 7, and a somewhat elongated stem portion 12. There is a bore 13 extending throughout the length of the adapter, in order to provide an air passage from the compression chamber through the aperture 15 in the skirt of the spark plug to the end of the stem of the adapter to which the gauge is to be applied.

One important advantage of the present invention, is that the organization of the plug, and its adapter, may be made without removing the skirt of the plug from the casing. This is often a laborious task, sometimes involving the use of special wrenches, and at any rate, not desirable if it can be avoided. So, with the present invention, it is intended that the cap 8 shall be removed, freeing the porcelain, and its electrode, so that the porcelain may be removed, and the adapter substituted in position against the gasket 7. The cap 8 is then returned, and is, of course, provided with wrench faces whereby the operator may tighten same in position to hold the adapter securely and centrally in the plug. It will be noted that the stem of the adapter projects some considerable distance above the top surface of the cap, when the latter is in its home position. The operator may apply his gauge with the engine turning over, and the pressure developed by the piston on its compression stroke in the cylinder will be indicated on the gauge. The advantages of the present device lie particularly in its inexpensiveness, its compactness, and in the ease with which it may be set up to convert a spark plug from its normal use to the use hereinbefore designated.

As many changes could be made in the above construction, and as many apparently widely different embodiments of the invention might be made without departing from the scope thereof, it is intended that all matter contained herein, or shown in the accompanying drawing, shall be considered as illustrative, and not in a limiting sense.

What I claim is:

1. An article of manufacture, comprising a hollow stud having a shank and means below said shank adapted to be fitted to, and secured in a spark plug in lieu of the removable insulated electrode thereof.

2. A device of the character described, comprising in combination, means, containing a vent, adapted to be substituted in a spark plug in place of the removable insulation, and electrode thereof, and means, comprising the locking nut of said plug originally used for securing said insulation and electrode in position therein, adapted to secure said first means in said substituted position.

3. A device of the character described, comprising a stud having an enlarged portion by which it may be secured in position in a spark plug in place of the removable electrode thereof, and having a shank portion elongated to extend beyond the plane of the top of the locking nut of said sparkplug when in use to secure said stud in position in said spark-plug.

4. A device for converting a spark plug into an air conduit comprising a member having a head adapted to fit against the shoulder which normally seats the insulation of one of the electrodes, and a stem projecting upwardly from said head to receive a gauge, there being an opening through the member providing an air conduit from a compression chamber of an engine to the gauge.

5. A device for converting a spark plug into an air conduit comprising a member having a head adapted to seat against the shoulder of the plug jacket which normally seats the central electrode, and a stem extending from said head to receive a gauge; said member having an opening extending throughout its length for the passage of air, and the head of said member being of sufficient dimension to be contacted with by the spark plug cap as it is threaded back in place after removal of the central electrode.

6. A device for converting a spark plug into an air conduit comprising a member having a head adapted to seat against the shoulder of the plug jacket which normally seats the central electrode, and a stem extending from said head to receive a gauge; said member having an opening extending throughout its length for the passage of air from a compression chamber to a gauge, and said member being of suitable dimension as to its head and stem so that when the spark plug cap is threaded back in the jacket after removal of the electrode the head may be contacted with by said cap and at such position of contact the stem will project beyond the cap.

ERNEST F. WACKWITZ.